United States Patent [19]

Keller

[11] 4,389,324

[45] Jun. 21, 1983

[54] POLYMERIC COMPOSITION FOR PREVENTING THE FORMATION OF SCALE DURING EVAPORATION OF SUGAR JUICES

[75] Inventor: Renate Keller, Düsseldorf, Fed. Rep. of Germany

[73] Assignee: Keller & Bobacek GmbH & Co., KG., Düsseldorf-Rath, Fed. Rep. of Germany

[21] Appl. No.: 252,247

[22] Filed: Apr. 8, 1981

Related U.S. Application Data

[63] Continuation of Ser. No. 92,455, Nov. 7, 1979, abandoned.

[30] Foreign Application Priority Data

Nov. 10, 1978 [DE] Fed. Rep. of Germany ....... 2848779

[51] Int. Cl.$^3$ ........................... C02F 5/10; C02F 5/12; C23F 14/02
[52] U.S. Cl. .................................. 252/180; 210/698; 210/701; 127/61
[58] Field of Search ................... 252/82, 86, 180, 181; 210/698, 701

[56] References Cited

U.S. PATENT DOCUMENTS

| | | | |
|---|---|---|---|
| 3,085,916 | 4/1963 | Zimmie | 252/174.24 |
| 3,483,033 | 12/1969 | Casey | 252/180 X |
| 3,686,145 | 8/1972 | Haschke | 252/180 X |
| 3,715,307 | 2/1973 | Johnson | 252/180 X |
| 4,126,549 | 11/1978 | Jones | 252/180 X |
| 4,175,100 | 11/1979 | Schiller | 252/180 X |
| 4,223,120 | 9/1980 | Kurowsky | 252/180 X |

FOREIGN PATENT DOCUMENTS 2522637 12/1976 Fed. Rep. of Germany ...... 252/180

*Primary Examiner*—Dennis L. Albrecht
*Attorney, Agent, or Firm*—Dennis P. Clarke

[57] ABSTRACT

Polymeric compositions useful for preventing formation of scale in apparatus used for evaporating sugar juices comprise a mixture of at least three polymers selected from polyacrolein or -methacrolein compounds, poly-acrylic or -methacrylic compounds, copolymers of the foregoing compounds, polyacrylamides and polymers of maleic anhydride alone or together with vinyl methyl ether, at least one of said polymers being present in an amount of at least 10% by weight and at least two of said polymers each being present in an amount of at least 5% by weight based on the total amount of said polymers.

2 Claims, No Drawings

POLYMERIC COMPOSITION FOR PREVENTING THE FORMATION OF SCALE DURING EVAPORATION OF SUGAR JUICES

This application is a continuation of application Ser. No. 092,455, filed Nov. 7, 1979, now abandoned.

Many evaporators for the concentration by evaporation of sugar juices are subject to the formation of coatings, known as scale, which reduce the passage of heat to such a degree that cleaning, in other words the removal of the coating is necessary during the working season. This problem arises in both the sugar beet and the unrefined sugar industries.

The scale contains varying amounts of calcium carbonate, calcium oxalate, calcium sulphate, calcium phosphate and silicic acid or silicates in addition to organic break-down products. As evaporation increases, the amounts of calcium oxalate and silicate which are deposited increase, and these reduce the passage of heat in a particularly noticeable manner. Avoidance of scale is one of the most important requirements from the point of view of heat economy. A coating of 1 mm thickness reduces water evaporation from 50 kg/(m$^2$h), depending on nature of the coating, to 14−7 kg/(m$^2$h). It is consequently necessary to find a way of preventing the formation of coatings in the evaporators during the working season and consequently obviating the need for shut-down of production, or to reduce the formation of coating to such a degree that at the end of the working season only slight incrustations are present, which can easily be removed.

It is an object of the invention therefore to prevent the formation of scale when evaporating sugar juice using means which are effective even when present in the smallest amount and which are quite safe from the biological point of view when introduced into the molasses. It is a further object of the invention to provide such means in the form of polymeric compositions comprising combinations of various polyelectrolytes which are considerably more effective than each individual component, i.e. synergistic effects are obtained.

U.S. Pat. No. 3,483,033 proposes that the formation of scale in evaporators when thickening sugar juice may be avoided by addition of 1 to 4 ppm hydrolysed polyacrylamide together with 7 to 28 ppm Na-hexametaphosphate as well as amounts of ethylene diaminotetraacetate and protective colloids. The large amount of hexametaphosphate present is however undesirable, particularly at the higher temperatures which occur when evaporating sugar juice, due to its low stability resulting in hydrolysis to orthophosphates. It is therefore another object of the invention to provide scale preventing compositions which avoid the use of such large amounts of product as well as rendering the use of polyphosphates, protective colloids and stoichiometrically effective complex formers unnecessary.

U.S. Pat. No. 3,463,730; U.S. Pat. No. 4,072,607 and U.S. Pat. No. 4,085,045 describe substances which reduce the formation of scale consisting of polyacrylamides hydrolysed to an extent of 60% to 90% and having a mean molecular weight lying in the range from about 500 to 70,000. There is no reference however to the use of these for reducing the formation of scale consisting mainly of calcium oxalate coatings in the evaporators used in sugar factories. Another object of the present invention therefore is to provide combinations of polymers of different types having a considerably improved effect on the prevention of scale, even without the use of anionic polyacrylamides.

According to the present invention therefore, there is provided a polymeric composition for preventing the formation of scale when evaporating sugar juices, which is characterized in that it contains a mixture of at least three polymers selected from the group consisting of (a) Polymers and/or salts of formula I

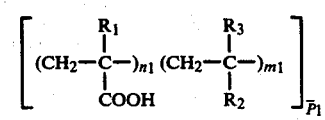

in which the following are:
$R_1$: —H, —OH, —CH$_3$, —CH$_2$OH and/or —Cl
$R_2$: —CHO, —CH$_2$OH and/or —COOCH$_2$CH$_2$COOH
$R_3$: —H, —CH$_3$ and/or —CH$_2$OH
$n_1$: 0.5 to 0.95
$m_1$: 0.05 to 0.5
$n_1 + m_1 = 1$
$\overline{P}_1$: 6 to 300

(b) Polymers and/or salts of formula I, which differ from the polymers according to (a) in the mean degree of polymerisation $\overline{P}_1$ by at least 20%, based on the value $\overline{P}_1$ of the polymer with the lowest mean degree of polymerisation.

(c) Polymers and/or salts and/or lower alkyl esters of formula II

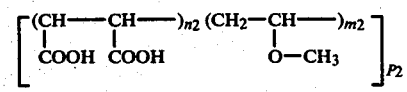

in which the following are:
$n_2$: 0.4 to 1.0
$m_2$: 0 to 0.6
$n_2 + m_2 = 1$
$\overline{P}_2$: 5 to 4000

(d) Polymers and/or salts of formula III

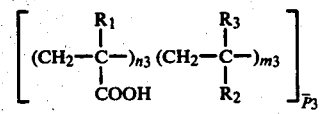

in which the following are:
$n_3$: 0.95 to 1
$m_3$: 0.05 to 0
$n_3 + m_3 = 1$
$\overline{P}_3$: 6 to 300
$R_1$, $R_2$ and $R_3$ have the same significance as in formula I (e) Anionic polyacrylamides and/or salts of formula IV

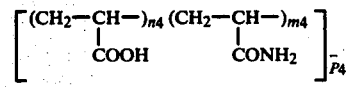

in which the following are:
$n_4$: 0.05 to 0.95
$m_4$: 0.95 to 0.05

$n_4 + m_4 = 1$ $\overline{P}_4$: 10 to 500 in which at least one of these polymers is present in an amount of at least 10% by weight and at least two of these polymers are present each in an amount of at least 5% by weight, based on the total amount of the polymers.

The invention further provides a process for evaporating sugar substances containing sugar juices in order to prevent the formation of mineral crust, which is characterized in that the above defined composition is added to the sugar juices.

When the polymers are present in the form of salts, alkali metals salts, in particular sodium salts are preferred. Basically, other salts as well, e.g., ammonium, amine salts or salts with other cations can be used.

The smallest amount which can be used depends in each case on the effectiveness of the mixture according to the invention used and the compositions of the sugar juice.

As a rule, a quite adequate effect is already obtained when the amount added, corresponding to the definition above, is at least 1.0 ppm, preferably at least 2.5 ppm. An adequate effect, i.e. appreciable reduction of the formation of scale in the evaporators during a whole sugar season of such a nature, depending on the composition of the sugar juice, that cleaning of the plant is only necessary at the end of the season or perhaps only once during the season, is in general obtainable when a maximum of 10 ppm, in many cases a maximum of 6 ppm and frequently such small amounts as only a maximum of 4 ppm, are added to the thin sugar juice. This represents extremely small amounts of the additives for reducing the formation of scale, which were not considered possible previously. The compositions according to the invention are added to the sugar juice to be evaporated as a general rule in several installments, i.e. before and between the individual evaporation stages. The evaporation of sugar juices normally takes place in equipment which consists of several evaporation stages operating in series. After the sugar juice has passed through one or several evaporators, it becomes increasingly concentrated. The amounts referred to above relate to the total amount of the polymers added. They do however relate to the weight of the thin sugar juice before entering into the first evaporation stage. When, for example, 3 ppm of composition are added to the thin sugar juice, based on the weight of the latter before entry into the first evaporation stage, it is for example possible to add half this amount before entry into the first evaporation stage, one quarter before entry into the third evaporation stage and one quarter before entry into the fifth evaporation stage.

The choice of the position at which addition is carried out depends on the distribution of the heating surfaces relating to the individual evaporation stages. The invention can be applied equally well to unrefined sugar and beet sugar.

Polymers of the formula I above are preferred in which the symbols have the following meaning:

$R_1$: —H and/or —CH$_2$OH, in particular —H $R_2$: —CHO, —CH$_2$OH and/or —COOCH$_2$CH$_2$COOH, particularly —CHO and/or —COOCH$_2$CH$_2$COOH $R_3$: —H and/or —CH$_2$OH, particularly —H In formula I, $n_1$ preferably represents 0.6 to 0.95, in particular 0.7 to 0.95, and $m_1$ correspondingly stands for 0.05 to 0.4 or preferably 0.05 to 0.3. The mean degree of polymerisation $\overline{P}_1$ is preferably 10 to 200, in particular 15 to 150.

In formula II, the symbols preferably have the following significance:

$n_2$: 0.4 to 0.8, in particular 0.4 to 0.6

$m_2$: 0.2 to 0.6, in particular 0.4 to 0.6

$\overline{P}_2$: 6 to 3,200, in particular 100 to 3,200

In formula III, the symbols preferably have the following significance:

$R_1$: —H and/or —CH$_3$, particularly —H $R_2$: —CHO, —CH$_2$OH and/or —COOH$_2$CH$_2$COOH, particularly —CHO and/or —COOCH$_2$CH$_2$COOH $R_3$: —H and/or —CH$_3$, particularly —H $\overline{P}_3$: 7 to 200, particularly 50 to 170

In the formula IV, the symbols preferably have the following significance:

$n_4$: 0.2 to 0.95, in particular 0.85 to 0.95

$m_4$: 0.05 to 0.8, in particular 0.05 to 0.15

$\overline{P}_4$: 10 to 100, in particular 20 to 80

The expression "lower alkyl" relates to straight or branched alkyl groups having 1 to 6, preferably 1 to 4 and especially 1 or 2 carbon atoms. Methyl esters and methyl side groups are preferred due to the ease with which they can be obtained.

The values given for n and m hence mean that the polymer is built up into the corresponding fraction of the total from repeating units of the respective group, in which these repeating units within one polymer molecule do not in each case need to be identical, but may also differ whilst taking into account the above definitions of the symbols $R_1$, $R_2$ etc. The sequence of the individual repeating units is not critical.

In each case the symbols $\overline{P}$ refers to the so-called mean degree of polymerisation.

The polymers of formulae I to IV or their salts are products which are available in the trade. The formulae which have been given are ideal formulae. As will be known to those skilled in this art, it is possible for the polymers also to have a restricted number of other recurring units or groups present, which result from the manufacturing conditions used.

Polymers of formula I are preferably manufactured by oxidative polymerisation of acrolein by itself or together with acrylic acid. According to West German Patent Application No. 2 357 036, these polymers are manufactured e.g. using oxidative polymerisation of acrolein (or methacrolein) alone or together with acrylic acid (or methacrylic acid), the monomer or monomer mixture being added slowly to a heated, agitated aqueous hydrogen peroxide solution, with or without subsequence neutralisation or the use of a Cannizzaro reaction, or, respectively, with or without aldol addition of formaldehyde. The polymerisation is preferably carried out in the presence of 0.1 to 10.0% by weight based on the weight of the monomer or monomer mixture, of thioethyleneglycol.

By selecting the reaction conditions, the starting products, the subsequent neutralisation with or without the use of a Cannizzaro reaction, or, respectively, addition of formaldehyde, the nature and number of the groups can be controlled, in particular the carboxyl, carbonyl, hydroxyl, and alkyl group content, as well as the mean molecular weight. It is possible for one polymer molecule to contain various recurring units of the formulae given in brackets, in which the symbols have differing meanings. It is hence possible for one polymer molecule to contain units which in each case have differing structures corresponding to the above definition of the symbols in formula I. The polymers are essentially linear. In the sense of the present invention, the nature of the terminal groups is not particularly critical. As a general rule, the terminal groups are hydroxyl groups, and these are consequently preferred according to the invention. With reference to the structure of these compounds, reference can further be made to the leaflet "POC" having the code number CH 215-0-2-678 of the company Degussa, Frankfurt, Federal Republic of Germany.

The —CHO group is also present in the hydrated form, due to the hydrolysis equilibrium with water. The group of formula —COOCH$_2$CH$_2$COOH is probably able to be formed during manufacture of the polymer as a result of a molecule of acrylic acid reacting with a carboxyl group present in the polymer chain. The —CH$_2$OH group in symbol R$_2$ is formed by reaction of the aldehyde group with NaOH by a Cannizzaro reaction.

The symbol $\overline{P}_1$ usually stands for at least 10, preferably for at least 15 and most advantageously 150 to 200. Corresponding to these values for $\overline{P}_1$, the average molecular weight of the polymers of formula I lie within the range from about 400 to 24,000 preferably from 650 to 16,000 and most advantageously from about 1000 to 10,000. These are only approximate values, since the molecular weights do not only depend on the value of $\overline{P}_1$ of the recurring units, but also on the nature of the substituents.

Polymers of formula II can for example be produced by polymerisation of maleic acid anhydride by itself or together with vinyl methyl ether in an inert organic solvent employing heating and the effect of a polymerisation catalyst with subsequent hydrolysis or esterification.

Polymers of formula III are for example produced using polymerisation of acrylic or methacrylic acid in an aqueous solution with the aid of a free radical forming catalyst, or even using saponification of polyacrylic acid chloride, polyacrylic nitrile or polyacrylic esters or, respectively using the corresponding polymethacrylic compounds. Apart from this, the methods given in connection with formula I also apply.

Anionic polyacrylamides of formula IV can be produced using polymerisation of acrylamide with subsequent hydrolysis of some amide group or using simultaneous polymerisation and hydrolysis of acrylamide or using other methods, including copolymerisation of acrylic acid and acrylamide or hydrolysis of polyacrylic nitrile etc.

In a preferred embodiment of the invention, the composition according to the invention contains polymers of formula I with differing mean degrees of polymerisation, expressed by the value for $\overline{P}_1$, in which at least two polymers differ in the mean degree of polymerisation $\overline{P}_1$ by at least 20%, based on the polymer with the lower value of $\overline{P}_1$. This can also be expressed by stating that polymers of formula I with differing ranges of molecular weight are present.

When the lowest polymer present according to formula I has a mean degree of polymerisation $\overline{P}_1 = 10$, (i.e. an average molecular weight of the order of magnitude of about 800) another polymer according to formula I must have an average degree of polymerisation of at least $\overline{P}_1 = 12$ (i.e. a mean molecular weight of the order of magnitude of about 1000). A third polymer present according to formula I can also differ only in the mean degree of polymerisation again by at least 20% based on the mean degree of polymerisation of the components with the next lowest molecular weight, or also differ by its chemical constitution, or by its mean degree of polymerisation and its chemical constitution. Most preferably, the various polymers according to formula I differ with respect to the mean degree of polymerisation $\overline{P}_1$ by at least 50%, particularly preferably by at least 90%.

According to the invention, it was in fact found that it is possible to obtain a strong synergistic effect concerning the prevention of formation of scale when evaporating sugar juices, when at least three differing polymers of the type defined above are employed simultaneously.

The compositions of the invention preferably contain at least two polymers of formula I, the mean degree of polymerisation of which differ as defined above, and at least one further polymer selected from the group of polymers (c) to (e). It can also contain at least three differing polymers according to formula I and optionally one or more polymers (c), (d) and/or (e).

The amount of polymers according to formula I (based on the total amount of the polymers contained in the compositions of the invention) is at least 40, preferably 60 and especially at least 80% by weight. Extremely good results are also obtained when the compositions of the invention only consist of various polymers of formula I.

When the compositions of the invention, in addition to polymers of formula I, also contain other polymers, these are preferably polymers of formulae II and/or III.

The number of the various polymers is not theoretically limited. In practice it is obviously not reasonable to mix an extremely large number of differing polymers with each other, in order to obtain the means according to the invention. In general therefore, not more than six to eight, and preferably not more than four, differing polymers are mixed together.

At least two of the polymers according to (a) to (e) above are each present in an amount of at least about 10 percent by weight.

The polymers in the compositions of the invention are preferably used in the form of the alkyl metal salts, so that a pH value in aqueous solution between about six and eight is obtained.

When the means according to the invention is added to the sugar juices, the deposition of scale forming substances in particular those based on calcium, is prevented, so that during the whole working season, hardly any coating forms on the surfaces of the evaporation tube on the production side and interruption of production during one season can be avoided.

When using the compositions according to the invention, continuous control of the scale preventing effect of the agent employed can be of considerably practical use. This can be carried out for example by subtracting the analytically determined $Ca^{2+}$ content of the sugar juice at the end of the evaporating station from the $Ca^{2+}$ content which is calculated from the $Ca^{2+}$ content of the thin sugar juice prior to entry into the evaporation station multiplied by the evaporation factor of the evaporating station, which here means the quotient of the throughput of thin sugar juice and the throughput of sugar juice at the end of the evaporation station. For example, it can be determined analytically by the increase in the $Cl^-$ content or by the increase of the sugar content in the sugar juice when carrying out evaporation. When the difference between the analytically determined and the calculated $Ca^{2+}$ content of the sugar juice at the end of the evaporation station is equal to zero, no scale consisting of calcium compounds has been able to form.

Polyelectrolytes employed for calcium hardness stabilisation when carrying out evaporation are not subject to hydrolysis like polyphosphates, which can lead to the formation of calcium phosphate coatings during the approximately two hour evaporation process.

EXAMPLES 1 TO 10

Experience has shown that the scale-forming effect of the oxalate ions formed during the evaporation process can be simulated in the laboratory by adding an amount of sodium oxalate which is approximately equivalent to the Ca-hardeners of the thin sugar juice, to the thin sugar juice at 95° C. and then after 30 minutes measuring the Tyndall effect of the turbidity produced using a Tyndallmeter, e.g. using a spectro-colorimeter of the type E 1009 manufactured by the METROHM company set to a high level of sensitivity.

The additional presence of considerably under-stoichiometric amounts of the claimed polymer mixture in the thin sugar juice leads to the reaching, using the same process, of considerably reduced Tyndall values; this reduction of the light scattering provides a measure of the scale reducing effect of the polymer additives.

The following examples show the high effectiveness of the means according to the invention. The items shown in Table 1 have the following significance:

| | |
|---|---|
| A: | First component |
| B: | Second component in the means used |
| C: | Third component |
| $c_{OX}$: | Sodium Oxalate content, given in an equivalent Ca-hardness (°dH) |
| $T_y(c_{OX})$: | The value read from the Tyndallmeter for the 90° light scattering of the turbidity, which has formed after 30 minutes subjection to the given amount of sodium oxalate $c_{OX}$ at 95° C. in the thin sugar juice. (divisions on the scale) |
| Components of the formula | Formulae I to IV, which describe the components A, B and C, and wherein $R_1$ represents —H, $R_2$ represents —CHO and/or —COOCH$_2$CH$_2$COOH, and $R_3$ represents —H. |
| $n_y$: | Amount of the molecule portion indexed by $n_y$ in the formulae I to IV in the components A, B and C. y: 1, 2, 3 and 4 corresponding to the given formulae I, II, III and IV. |
| $\overline{P_y}$: | Mean degree of polymerisation of the components A, B and C. y: 1, 2, 3 and 4, corresponding to the given formulae I, II, III and IV. |
| $T_y(C_{A,B,C},c_{OX})$: | The value read from the Tyndallmeter for the 90° light scattering of the turbidity, which has been formed after 30 minutes effect of a content of 0.88 ppm of components A, B or C and the given amount of sodium oxalate $c_{OX}$ at 95° C. in the thin sugar juice. (divisions on the scale). |
| Portions in the mixture Z: | Amounts of components A, B and C in percentage by weight. |
| $T_y(c_Z,c_{OX})$: | The value read from the tyndallmeter for 90° light scattering of the turbidity, which has been formed by 30 minutes influence of a content of 0.88 ppm of the given mixture of the component A, B and C and the given amount of sodium oxalate $c_{OX}$ at 95° C. in the thin sugar juice. (divisions on the scale). |

The sensitivity setting of the Tyndallmeter used was the same for all the measurements of turbidity carried out. The Ca-hardness of the thin sugar juice used in the test was in the region of 7°–15° dH. In particular the Figures for $n_y$ and for the average degree of polymerisation should be considered within the framework of the accuracy which can be obtained in the present state of the art.

The values given in the last row of the table for the mixtures according to the invention lie appreciable below the values for the individual components and do show the extremely pronounced and surprising synergistic effect. When using the mixtures according to the invention, turbidity is almost completely avoided, whilst when the individual components are added hardly any effect occurs. It should again be stated that as can be seen from the definitions preceding the table, the mixtures according to the invention were added in the same amount of 0.88 ppm, as were the individual components.

TABLE 1

| | | Example | | | | | | | | | |
|---|---|---|---|---|---|---|---|---|---|---|---|
| | | 1 | 2 | 3 | 4 | 5 | 6 | 7 | 8 | 9 | 10 |
| $c_{OX}$ | | 10 | 10 | 20 | 10 | 10 | 10 | 10 | 10 | 10 | 10 |
| $T_y(c_{OX})$ | | 52 | 52 | 88 | 54 | 55 | 52 | 78 | 50 | 51 | 52 |
| Components | A | I | I | I | I | I | I | I | I | I | II |
| of | B | I | I | I | I | I | I | II | II | III | III |
| formula | C | I | II | II | III | III | IV | III | IV | IV | IV |
| $n_y$ | A | 0.76 | 0.76 | 0.76 | 0.76 | 0.76 | 0.76 | 0.82 | 0.82 | 0.82 | 0.5 |
| | B | 0.82 | 0.82 | 0.82 | 0.82 | 0.82 | 0.82 | 0.5 | 0.5 | 1 | 1 |
| | C | 0.88 | 0.5 | 0.5 | 1 | 1 | 0.88 | 1 | 0.88 | 0.9 | 0.88 |
| $\overline{P_y}$ | A | 20 | 20 | 20 | 20 | 20 | 20 | 60 | 60 | 60 | 170 |
| | B | 60 | 60 | 60 | 60 | 60 | 60 | 3200 | 85 | 70 | 70 |
| | C | 120 | 170 | 170 | 160 | 70 | 65 | 70 | 65 | 22 | 65 |
| $T_6$ | A | 12 | 10 | 42 | 10 | 10 | 11 | 8 | 11 | 10 | 12 |
| $(c_{A,B,C},c_{OX})$ | B | 8 | 9 | 29 | 10 | 10 | 10 | 10 | 12 | 10 | 11 |
| | C | 8 | 11 | 13 | 14 | 10 | 31 | 9 | 32 | 30 | 30 |
| Portions | A | 20 | 20 | 20 | 30 | 30 | 20 | 20 | 34 | 60 | 34 |
| in the | B | 40 | 40 | 40 | 35 | 20 | 50 | 20 | 33 | 20 | 33 |
| mixture Z | C | 40 | 40 | 40 | 35 | 50 | 30 | 60 | 33 | 20 | 33 |
| $T_y(c_Z,c_{OX})$ | | 1.0 | <0.5 | <0.5 | <0.5 | 0.5 | 0.5 | <0.5 | 2.0 | 1.5 | 0.5 |

EXAMPLE 11

After being subject to the effect over 30 minutes of varying amounts of a combination of active constituents according to U.S. Pat. No. 3,483,033 obtainable in the trade, in the form of scale-preventing Fabcon 1-12 produced by the Company Fabcon International Inc., San Francisco, Calif., U.S.A., and an amount of sodium oxalate equivalent to 10° dH Ca-hardness, thin sugar juice with a pH value of 9.3 and a Ca-Hardness of 6.5° dH at 95° C. produce the following values for 90° light scattering. They are provided for comparision with the usage of a corresponding amount of a polymer mixture according to example 4. The data relating to amounts of the additives is given in ppm of active substance; the Tyndall values are given in scale divisions.

TABLE 2

| ppm | Combination according to U.S. Pat. No. 3 483 033 | Combination according to Example 4 |
| --- | --- | --- |
| 0 | 68 | 68 |
| 0.22 | 51 | 23 |
| 0.44 | 45 | 14 |
| 0.88 | 35 | 4.5 |
| 1.75 | 35 | <0.5 |
| 3.50 | 7 | <0.5 |

The considerable increase in effectiveness produced by the new combination can clearly be seen.

EXAMPLE OF APPLICATION 1

In a sugar factory processing beet, a mixture of polymers according to example 4 containing in all 3.5 ppm effective substance, based on the weight of the thin sugar juice prior to entry into the evaporation station, was added to the sugar juice during the approximately three months working season.

The thin sugar juice had on average a pH value of about 9.0 and a Ca-hardness of 5°-10° dH. The polymer mixture was introduced in the form of a 35% aqueous solution neutralised with caustic soda, 50% of the amount used being fed in prior to the first stage and about 25% before the penultimate and last stages of the evaporation station making use of dossing pumps.

As against the previous working season, scale was barely formed on the evaporation pipes on the production side during the whole working season. This led to a considerably improved passage of heat from the heating steam to the sugar juice, which could be noticed in practice by reduced counter-pressure of the heating steam with the same heating power. Cleaning of the evaporator during the season, which would otherwise have been necessary, did not need to be carried out during the whole period. This represents a technological effect which was not considered previously to be possible in the sugar industry. It gives proof of the outstanding effectiveness of the means according to the invention.

I claim:

1. A polymeric composition for preventing the formation of scale when evaporating fruit juices, which is characterized in that it contains a mixture of at least three polymers, at least two of said polymers being selected from the group consisting of:

(a) polymers and salts of formula I

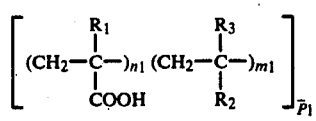

wherein:
$R_1$ is —H, —OH, —CH$_3$, —CH$_2$OH and/or —Cl
$R_2$ is —CHO, —CH$_2$OH and/or —COOCH$_2$CH$_2$COOH
$R_3$ is —H, —CH$_3$ and/or —CH$_2$OH
$n_1$ is 0.5 to 0.95
$m_1$ is 0.05 to 0.5
$n_1 + m_1 = 1$, and
$\overline{P}_1$ is 6 to 300;

and wherein said polymers of formula I differ in the mean degree of polymerisation $\overline{P}_1$ by at least 20%, based on the value $\overline{P}_1$ of the polymer with the lowest mean degree of polymerisation; and at least one further polymer selected from the group consisting of:

(b) a polymer or salt of formula II

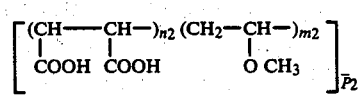

wherein:
$n_2$ is 0.4 to 1.0
$m_2$ is 0 to 0.6
$n_2 + m_2 = 1$
$\overline{P}_2$ is 5 to 4000, or a lower alkyl ester thereof;

(c) a polymer or salt of formula III

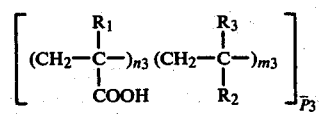

wherein:
$n_3$ is 0.95 to 1
$m_3$ is 0.05 to 0
$n_3 + m_3 = 1$
$\overline{P}_3$ is 6 to 300
$R_1$, $R_2$ and $R_3$ have the same meaning as in (a);

(d) an anionic polyacrylamide or salt of formula IV

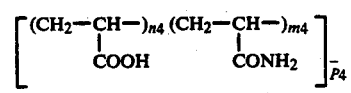

wherein:
$n_4$ is 0.05 to 0.95
$m_4$ is 0.95 to 0.05
$n_4 + m_4 = 1$
$\overline{P}$ is 10 to 500 in which at least one of the polymers is present in an amount of at least 10% by weight and at least two of the polymers are present each in an amount of at least 5% by weight, based on the total amount of the polymers.

2. A polymeric composition for preventing the formation of scale when evaporating fruit juices, which is characterized in that it contains a mixture of at least three polymers, at least three of said polymers being selected from the group consisting of:

(a) polymers and salts of formula I

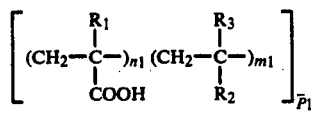

wherein:

$R_1$ is —H, —OH, —CH$_3$, —CH$_2$OH and/or —Cl
$R_2$ is —CHO, —CH$_2$OH and/or —COOCH$_2$CH$_2$COOH
$R_3$ is —H, —CH$_3$ and/or —CH$_2$OH
$n_1$ is 0.5 to 0.95
$m_1$ is 0.05 to 0.5
$n_1 + m_1 = 1$, and
$\overline{P}_1$ is 6 to 300;

and wherein said polymers of formula 1 differ in the mean degree of polymerisation $\overline{P}_1$ by at least 20%, based on the value $\overline{P}_1$ of the polymer with, in each case, the lowest mean degree of polymerisation; said remaining polymers being selected from the group consisting of:

(b) a polymer or salt of formula II

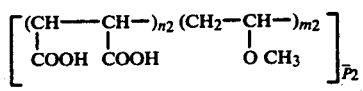 II wherein:
$n_2$ is 0.4 to 1.0
$m_2$ is 0 to 0.6
$n_2 + m_2 = 1$
$\overline{P}_2$ is 5 to 4000, or a lower alkyl ester thereof;

(c) a polymer or salt of formula III

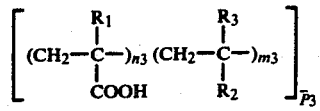 III wherein:
$n_3$ is 0.95 to 1
$m_3$ is 0.05 to 0
$n_3 + m_3 = 1$
$\overline{P}_3$ is 6 to 300
$R_1$, $R_2$ and $R_3$ have the same meaning as in (a);

(d) an anionic polyacrylamide or salt of formula IV

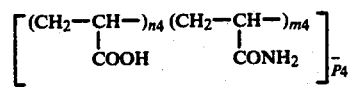 IV wherein:
$n_4$ is 0.05 to 0.95
$m_4$ is 0.95 to 0.05
$n_4 + m_4 = 1$
$\overline{P}$ is 10 to 500 in which at least one of the polymers is present in an amount of at least 10% by weight and at least two of the polymers are present each in an amount of at least 5% by weight, based on the total amount of the polymers.

* * * * *